United States Patent [19]
Dominguez

[11] Patent Number: 5,517,358
[45] Date of Patent: May 14, 1996

[54] TRACKING REFLECTOR ASSEMBLY HAVING MEANS FOR ACCURATELY SYNCHRONIZING THE MOVEMENT THEREOF AND FOR PROVIDING QUICK ACCESS TO SYSTEM SWITCHES FOR INSPECTION AND REPAIR

[75] Inventor: Richard L. Dominguez, Rancho Palos Verdes, Calif.

[73] Assignee: So-Luminaire Daylighting Systems Corp., Los Angeles, Calif.

[21] Appl. No.: 304,513

[22] Filed: Sep. 12, 1994

[51] Int. Cl.$^6$ .................................................. B02B 27/00
[52] U.S. Cl. .......................................... 359/592; 359/591
[58] Field of Search ................................ 359/591, 592, 359/593, 596, 597

[56] References Cited

U.S. PATENT DOCUMENTS 4,883,340  11/1989  Dominguez ............................. 350/260

Primary Examiner—Michael L. Gellner
Assistant Examiner—Daniel P. Malley
Attorney, Agent, or Firm—Irving Keschner

[57] ABSTRACT

An improved system for synchronizing the positioning of a reflector assembly used in solar lighting apparatus for illuminating the interior of a roofed building. The reflector assembly is rotatable about a vertical access for tracking daily movements of the sun. The assembly includes return, track and seek sensors, the return sensor, in the turn-on mode, generating a signal corresponding to sensed sunlight, which energizes the systems motor. The system comprises the master tracking assembly and a plurality of follower units. Each motor shaft extends into a gear box and is coupled to a worm gear. A radial worm gear is mounted to a shaft member and is driven by the worm gear. The shaft member in turn drives the mirror reflector assembly. A stepper wheel having a plurality of indentations formed thereon is also mounted to the shaft member. The roller wheel of an associated switch coacts with the stepper wheel, the motor being intermittently turned off each time the roller wheel falls into a stepper wheel indentation as the shaft member is rotated. The system switches are mounted on a removable plate positioned within a gear box. A cover member encloses the gear box and is removable to allow access to the plate whereby the switches can be inspected and repaired, if necessary, without disassembly of the reflector mirror assemblies or removal of the reflector assembly from the skylight.

10 Claims, 3 Drawing Sheets

TRACKING REFLECTOR ASSEMBLY HAVING MEANS FOR ACCURATELY SYNCHRONIZING THE MOVEMENT THEREOF AND FOR PROVIDING QUICK ACCESS TO SYSTEM SWITCHES FOR INSPECTION AND REPAIR

BACKGROUND OF THE INVENTION

1. Field of the Invention

The present invention provides a solar lighting reflector apparatus for illuminating the interior of a roofed building having an improved system for synchronizing the mechanism used to track the daily movements of the sun and provides a means for allowing various system components to be easily inspected and repaired when necessary without disassembling the reflector mirrors or removing the reflector apparatus from the building roof.

2. Description of the Prior Art

The assignee of the present invention currently owns four patents which relate to solar lighting reflector apparatus. In particular, U.S. Pat. No. 4,114,186 discloses a solar lighting fixture which, in one embodiment, discloses a telescoping cylindrical light duct including a rotatable upper portion having a pivotably connected reflective lid; U.S. Pat. No. 4,429,952 discloses a reflector assembly which includes a ring-shaped base member rotatably supported above a skylight; U.S. Pat. No. 4,620,771 discloses a solar tracking reflector apparatus wherein one or more photovoltaic panels are coupled to the solar lighting reflector apparatus for rotational movement therewith in order to generate electrical power for operating the horizontal and vertical drive motors, as well as the control circuitry related thereto. The '771 patent further discloses a horizontal tracking control arrangement using a pair of photosensors and a shade which prevents sunlight from directly striking one of the two photosensors when the reflector assembly falls behind westerly movements of the sun, a control circuit detecting the imbalance between the signals generated by the pair of photosensors in order to advance the reflector assembly further to the west; and U.S. Pat. No. 4,883,340 discloses a solar lighting reflector apparatus including a reflector assembly having slatted mirrors which more uniformly spreads sunlight across an associate skylight dome when the sun is at relatively low elevational angles, as well as when the sun is more directly overhead, and which avoids the need for a vertical drive motor and associated rack arms, which additionally avoids the need for control circuitry used to operate a vertical drive motor, and which avoids the need for relatively large photovoltaic panels and storage batteries for creating and storing electrical power to operate the vertical drive motor.

Although the various patents set forth hereinabove, culminating in the improved system disclosed in U.S. Pat. No. 4,883,340, provided a new and unique method for illuminating the interior of a roofed building which substantially decreases the cost thereof when compared to conventional electrical and/or passive solar lighting systems, the synchronization of the master motor and the follower motors, although satisfactory, is somewhat erratic due to the inertia of the motors, the motors tending to continue to operate even when stopping signals are supplied thereto. This in turn reduces the overall cost and efficiency of the solar lighting apparatus. In addition, the various switches are located in a manner such that they are exposed to the elements, such as rain, heat, dust, etc. This in turn can cause the components to malfunction, decreasing system lifetime and increasing the overall cost of the solar lighting reflector apparatus, including the costs of replacing the malfunctioning switches which typically require the disassembly of the system mirrors. In addition, prior art solar lighting systems typically include three legs to mount the reflector assembly to the roof, increasing sun shadowing on the skylight and increasing manufacturing, shipping and installation costs.

What is desired is to provide an improved solar lighting apparatus wherein the master and follower units which make up the reflector assembly are synchronized in a manner to increase the efficiency of the overall solar lighting apparatus. In addition, it is desired to provide an improved solar lighting apparatus wherein the switch components are not exposed to the elements and are easily accessible for inspection and repair or replacement, if necessary. Finally, it is desired to eliminate the third mounting leg to reduce sun shadowing on the skylight and to reduce system manufacturing, shipping and installation costs.

SUMMARY OF THE PRESENT INVENTION

The present invention provides an improved system for synchronizing the position of a reflector assembly used in solar lighting apparatus for illuminating the interior of a roofed building. The reflector assembly is rotatable about a vertical access for tracking daily movements of the sun. The assembly includes return and track sensors, the return sensor, in the turn-on mode, generating a signal corresponding to sensed sunlighting which energizes the systems motor. The system comprises the master tracking assembly and a plurality of follower units. Each motor shaft extends into a gear box and is coupled to a worm gear. A radial worm gear is mounted on a shaft member and is driven by the worm gear. The shaft member in turn drives the mirror reflector assembly. A stepper wheel having a plurality of indentations, or gears, formed thereon is also mounted to the shaft member. The roller wheel of an associated switch coacts with the stepper wheel, the motor being intermittently turned off each time the roller wheel falls into a stepper wheel indentation as the shaft member is rotated. The system switches are mounted on a removable plate positioned within a gear box with the stepper wheel. A cover member encloses the gear box and is removable to allow access to the plate whereby the switches can be inspected and repaired, if necessary, without disassembly of the reflector mirror assemblies or removal of the reflector assembly from the skylight. In addition, the mirror reflector assembly is supported on the skylight with two leg members instead of the three leg members typically utilized in the prior art.

The present invention thus provides an improved solar lighting apparatus wherein the master and follower units are synchronized of in a manner to increase the lighting efficiency of the overall solar lighting apparatus and wherein the switch components are enclosed in a gear box and which are easily accessible for inspection and repair, if necessary, without disassembling the reflector mirrors or removing the solar reflector lighting apparatus from the skylight. In addition, the use of two mounting leg members reduces sun shadowing on the skylight and reduces the system manufacturing, shipping and installation costs.

BRIEF DESCRIPTION OF THE DRAWING

For better understanding of the present invention as well as other objects and further features thereof, reference is made to the following description which is to be read in conjunction with the accompanying drawing wherein.

DETAILED DESCRIPTION OF THE INVENTION

The present invention, an improvement to the solar lighting reflector apparatus disclosed in the aforementioned patents and other commercially available units, is concerned with both improving the synchronization between the master tracking unit and the plurality of follower units in order to increase the overall efficiency of the solar lighting reflector system, and in improving the lifetime of the switching components utilized in those prior art apparatus. For the sake of clarity, the discussion that follows will be directed to certain features of the improved solar reflector apparatus; details of the operation of a tracker reflector assembly can be found, for example, in U.S. Pat. No. 4,883,340, any teaching of which that is necessary for an understanding of the present invention being incorporated herein by reference.

Figure 1:
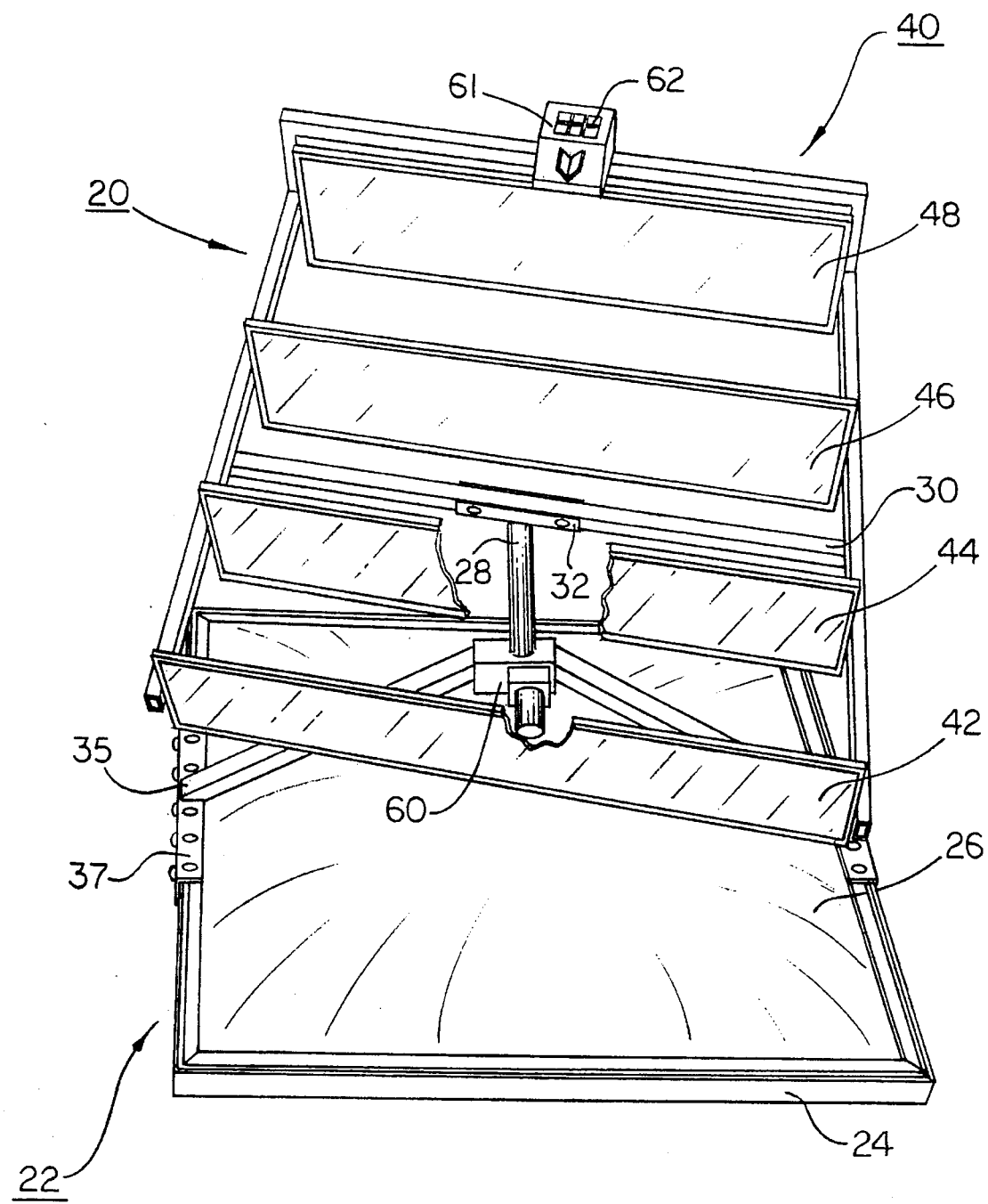
FIG. 1 is a perspective view of a solar lighting apparatus in accordance with the teachings of the present invention.

In FIG. 1, a solar lighting reflector apparatus is designated generally by reference numeral 20 and includes a skylight 22 having a generally square metallic skylight frame 24 and a light transmissive plastic dome 26.

Solar lighting reflector apparatus 20 includes a rotatable shaft 28, a horizontal support bar 30, a U-shaped channel 32 in which support bar 30 is positioned and two elongated support legs 34 and 35 having one end secured to bar brackets 36 and 37, respectively, mounted on skylight frame 24. It should be noted that prior solar reflector assemblies utilized three support legs. In this case, by increasing the aluminum tube leg diameter from 1"×1" square to 1¼" to 1¼" square and designing the leg mounting brackets to the skylight frame longer, i.e., from 3 inches to 8 inches with additional screw holes in each bracket, only two support legs are necessary to withstand very high winds. The advantages of using two legs instead of three are:

1. The system is less costly to manufacture, ship and install on the roof;
2. The system can be easily retrofitted inexpensively to existing rectangular type skylights; and
3. There is less shadowing from the legs on the skylight.

Shaft 28 is coupled to horizontal support bar 30 to rotatable position and set the correct angle of the slatted reflector assembly 40.

Slatted reflector assembly 40 includes a series of four planar reflector panels, including frontmost panel 42, intermediate panels 44 and 46, and rearmost panel 48.

Each of the plurality of reflector panels 42, 44, 46, and 48 serves to reflect sunlight into the skylight dome 26 for illuminating the interior of a building below. Each reflective panel extends between first and second opposing ends along a generally horizontal longitudinal axis. For example, reflective panel 42 extends between a first end covered by edge strip 50 and a second end covered by edge strip 52. The horizontal longitudinal axes of the reflective panels may be continuously directed toward the sun.

Solar lighting reflector apparatus 20 includes a 12 volt storage battery (not shown) which may be conveniently placed adjacent skylight frame 24 upon the roof of the building. This battery stores electrical power used to operate a horizontal drive motor 120 for periodically rotating shaft 28 and thus reflector assembly 40 to follow daily east-to-west movements of the sun. A 12 volt relay box (not shown) is secured upon skylight frame 24 and is electrically interconnected between the storage battery and the horizontal drive motor for selectively electrically coupling power thereto. A 120 volt/12 VDC stepdown transformer can also be used as the systems power supply in lieu of the battery as will be set forth hereinafter with reference to FIG. 3.

Figure 3:
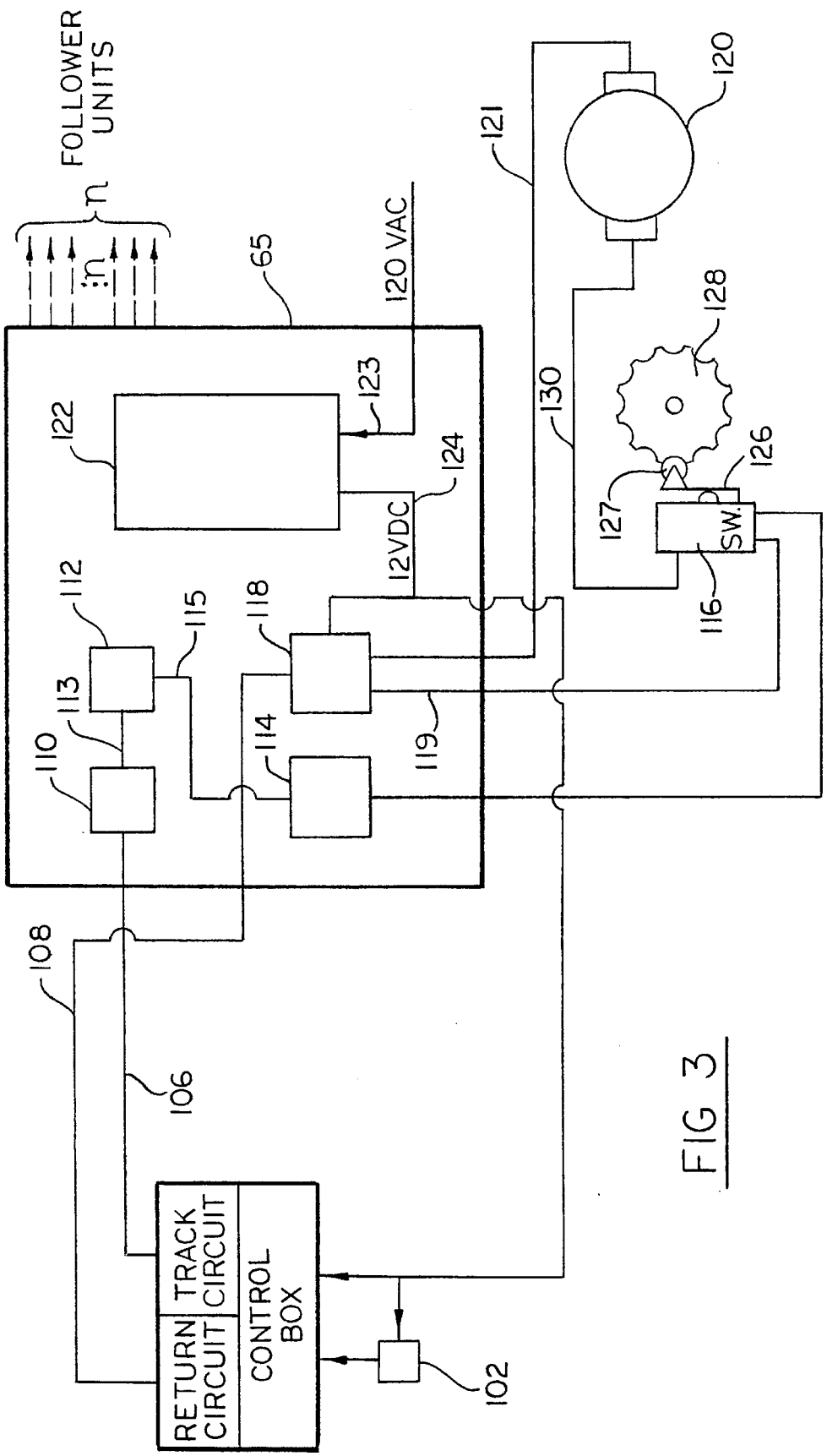
FIG. 3 is a block diagram of the circuitry for controlling the sun tracking and the electronic synchronization operation of the horizontal drive motors used in the present invention.

Solar lighting reflector apparatus 40 includes a compact gear box 60, positioned below and adjacent to channel 32 and which contains the worm gear, stepper wheel, stepper switch and east/west limit switches. Suntracker 61 contains the sensors and circuitry used to sense the position of the sun and to signal the application of electrical power to horizontal drive motor 120 through the power supply, synchronizing and relay components as described hereinafter with reference to FIG. 3. Suntracker 61 is mounted to the reflector apparatus 40 as illustrated and contains the circuitry to sense the position of the sun and to signal to control box 60 the application of electrical power to horizontal drive motor 120 (FIG. 3). Associated with suntracker 61 is shadow flap 63 as described in the '340 patent.

In the event that a control (stop) infrared photodetector (not shown) is illuminated with a predetermined amount of light, it generates a stop signal which is used by the control circuitry associated with gear box 60 to inhibit any further activation of the horizontal drive motor 120 (module 65, mounted inside the building, houses the 120 v/12 VDC stepdown power supply, the synchronizing circuit and the relay control units. There is one module 65 for each 20 reflector assemblies, i.e. one master and 19 follower units).

Stop and tracking infrared photodetectors (not shown) protrude through control box 61 and are supported for rotation along with reflector assembly 40. Moreover, these infrared photodetectors generally face the sun as long as reflector assembly 40 is directed toward the sun. While panel 63 shades the infrared photodetectors from direct sunlight when reflector assembly 40 is properly aligned with the sun, reflected and dispersed sunlight existing under cloudy-bright conditions can reach both infrared photodetectors even though reflector assembly 40 is correctly positioned with respect to the sun. Under such conditions, the tracking infrared photodetector becomes illuminated and generates the track signal. To avoid false tracking under such conditions, the stop signal generated by the infrared photodetector causes the control circuitry to disable the horizontal drive motor 120, thereby preventing further tracking, until such cloudy-bright conditions are no longer present.

Figure 2:
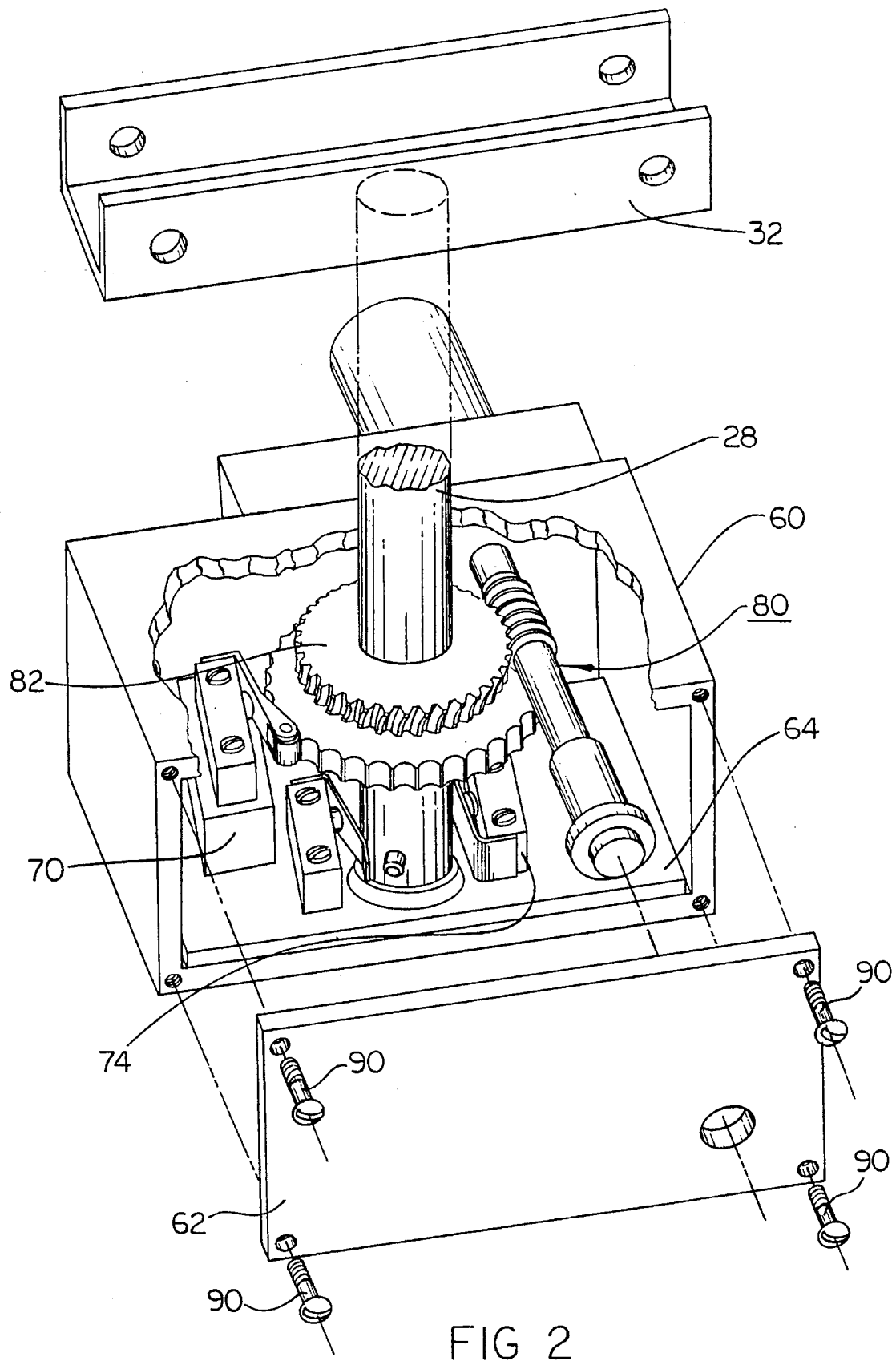
FIG. 2 is an assembly view showing the apparatus switches mounted on a plate within a gear box, the stepper wheel also being positioned in the gear box.

Referring now to FIG. 2, a perspective/exploded view of the present invention is illustrated. Gear box 60, illustrated with cover 62 removed, has a removable plate member 64 positioned therein. Mounted to plate member 64 are switches 70, 72, and 74, switch 70 controlling stepper wheel synchronization, switch 72 controlling the east limit position, and switch 74 controlling the west limit position. A worm gear driver 80, driven by the horizontal drive motor 120, in turn drives shaft 28 via radial worm gear 82 in a conventional manner. Screw 84 turns off the east or west limit switches when the mirror assembly has reached its maximum value. A stepper wheel 128, the operation of which is described hereinbelow, is also positioned within gear box 60. Locating stepper wheel 128 inside of gear box 62 with the other switch components instead of externally thereto, protects the wheel from the elements and reduces the necessity of using separate covers for the stepper wheel switch components. The preferred stepper wheel as illustrated, has a 10° per step configuration, thus enabling the system to seek the sun faster than systems previously available.

When the tracker reflector assembly is operative, cover 62 is secured to box 60 via screws 90. If the system becomes inoperative and it is determined that the problem is due to one of the switches in the gear box 60, a service person can easily remove cover 62 and plate member 64 and make the necessary repairs on site without disassembling the reflector mirrors or removing the solar reflector apparatus from the skylight. Plate member 64 is removably secured within box 60 by two screws (not shown) installed from the bottom of gear box 60. In prior art installations, with the switches mounted on the assembly adjacent the roof itself, it was extremely difficult for a service person to make the necessary repairs without disassembling the mirrors and removing the apparatus from the skylight.

Referring now to FIG. 3, a simplified block diagram of the circuitry used to control the operation of the master horizontal drive motor 120 (and the operation of the horizontal drive motors of the follower units) is illustrated.

A 12 volt signal generated by DC power supply, or stepdown transformer, 122 (or, in an alternate design, by a photovoltaic panel) is supplied to voltage reducer 102 which in turn generates a 6 volt DC signal at its output. The 12 volt and 6 volt signals are coupled to tracker box 61, the output of which are 12 volt signals applied to leads 106 and 108. The output on lead 106 is applied to repeat cycle timer 110, the output of which is coupled to pulse generator 112 via lead 113. The output of pulse generator 112 is applied to track relay 114 via lead 115, the output of which, corresponding to an intermittent ground signal, is applied to single pole, double throw roller switch 116 via lead 117. The signal on lead 108 is coupled to return relay 118, the output on lead 119, corresponding to +12 VDC (or –12 VDC), being coupled to a second input of switch 116. The second output of relay 118, corresponding to –12 VDC (or +VDC) is coupled to one input of the D.C. horizontal drive motor 120 via lead 121. Motor 120 is mounted on the front of gear box 60. Stepdowntransformer 122 converts 120 VAC on lead 123 to 12 VDC on output lead 124 which is coupled to the second input of relay 118. The mechanical wire output 126 of switch 116 has a roller device 127 at its output which is positioned to coact with a stepper wheel 128 mounted to the shaft of worm gear 80. The output of switch 116 is coupled to the other input of motor 120 via lead 130.

In operation, the return sensor 61 (in the turn-on mode) sees light and the tracker and the tracker circuit sends a 12 v signal on lead 108 which energizes the return relay 118 in gear box 60. The current is now established for tracking and all motors (master and follower units) are activated via the signal on lead 121. The motor 120 will run until its roller wheel 127 of the stepper switch 116 rolls into a dip on stepper wheel 128. The stepper switch 116 is now open and the signal on lead 130 terminated, thus turning off motor 120. It should be noted that the operation described hereinabove for the master unit is identical for the follower units and the reference numbers utilized would refer to identical components in the follower units. In a preferred configuration, there are 19 follower units for each master unit.

When the track sensor (not shown) sees a sufficient light level it sends a 12 v signal on lead 106 to repeat cycle timer 110 in control box 60, generating a 0.2 second pulse which is applied to the pulse generator 112. Pulse generator 112 generates a 1 second pulse on lead 115 which energizes the track relay 114, connecting all motors with a ground, via lead 130 and activating all motors in the track direction. As the stepper wheel 120 rotates, the stepper switch 116 comes up out of its dip. Motor 120 remains activated until the stepper switch rolls into the next dip of its stepper wheel 128. If the tracker has moved enough so that the track sensor is shaded from the sun by the shadow flap, the track signal from the tracker will terminate and tracking will end. If the track sensor is still exposed to light, the track signal will still be present and the repeat cycle timer 112 will generate another 0.2 second pulse causing the above process to repeat resulting in another complete step. This will continue as long as the track sensor is unshaded. When the units are pointed at the sun the tracker box of the master unit will shade its track sensor, ending the stepping process. As the sun moves westward, the track sensor will become unshaded and another step will take place. This process takes place until sunset. To help prevent tracking too far ahead in certain cloudy conditions, a stop sensor will become unshaded causing the stepping process to end.

At sunset, the return sensor sees darkness. The tracker ends its 12 v signal to the return relay 118. The return relay 118 then de-energizes causing the current to the motor 120 (and the corresponding motors in the follower units) to flow in a reverse direction by a signal applied via lead 121. The control box 60 supplies a continuous ground and all units return eastwardly without the stepper switch 116 and the stepper wheel 128 impeding the motor shaft rotation until they hit a preset stop switch that removes the ground to the motors. All units are stopped by their limit switches at the same position ready for the next day. The use of the stepper switch and stepper wheel as described hereinabove provides an effective and accurate technique for synchronizing the position of the follower tracker reflector assemblies with the master tracker reflector assembly.

It should be noted that the synchronizing technique can be utilized with vertical drive motors of the type described in U.S. Pat. No. 4,429,952.

The present invention thus provides a solar lighting reflector apparatus which both provides an improved synchronization system between the master and follower units maximizing the light collection, and also providing a simplified technique for protecting the system switch components from the elements, and also allowing easy installation and repair of the components without requiring disassembly of the track mirrors or removal of the apparatus from the building roof thus enhancing serviceability of the system while reducing the cost associated therewith.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A solar lighting reflector apparatus for illuminating the interior of a roofed building during daylight hours and adapted to follow daily movements of the sum, the roofed building having a light transmissive opening in the roof thereon, said apparatus comprising:

a plurality of generally planar reflective panels for reflecting sunlight into the light transmissive opening, each of the reflective panels extending between first and second opposing ends along a generally horizontal longitudinal axis, the longitudinal axes of the plurality of reflective panels substantially being parallel to each other, the plurality of reflective panels including at least a frontmost reflective panel and rearmost reflective panel, the rearmost reflective panel being supported at a higher elevation than the frontmost reflective panel to avoid shading of the rearmost reflective panel by the frontmost reflective panel;

means for supporting said reflective panels above said light transmissive openings;

means coupled to said reflective panels for rotating said reflective panels when driven by a rotation force;

a rotatable shaft connected to said coupling means;

means for coupling the output shaft of a d.c. motor to said rotatable shaft whereby the reflective panels are directed to the sun as the sun moves throughout the day; and a worm gear and stepper wheel mounted to said rotatable shaft.

2. The reflector apparatus of claim 1 wherein said stepper wheel is positioned within a box, one side of said box having a removable cover.

3. The reflector assembly of claim 2 wherein a removable plate member is positioned on the bottom surface of said box.

4. The reflector assembly of claim 3 wherein a plurality of switch components are mounted to said removable plate member.

5. The reflector assembly of claim 4 wherein said coupling means comprises a driver and an associated worm gear.

6. The reflector assembly of claim 4 wherein a stepper wheel is coupled to said rotatable shaft, said stepper wheel coacting with one of the switch components mounted on said plate member.

7. The reflector assembly of claim 6 wherein said stepper wheel has a plurality of indentations formed on its periphery and said coacting switch means includes roller means positioned to ride on the periphery of said stepper wheel.

8. The reflector assembly of claim 7 further including circuit means for controlling the operation of said d.c. motor, said circuit means being responsive to return and tracking signals generated by sensors mounted on a control box positioned on said reflector assembly comprising:

a repeat cycle timer coupled to said track signal;

a pulse generator coupled to the output of said repeat cycle timer;

relay means coupled to the output of said pulse generator;

switch means coupled to the output of said relay means, one output of which being connected to a first terminal of said d.c. motor; and a return relay coupled to said return signal, a first output thereof being coupled to said switch means, a second output thereof being connected to a second terminal of said d.c. motor, the output of said switch means being connected to a roller wheel which is positioned to ride on the periphery of said stepper wheel.

9. The reflector assembly of claim 8 wherein a transformer provides d.c. power to said relay means and to said control box.

10. The reflector assembly of claim 1 wherein said supporting means comprises two leg members, each having first and second end portions, said first end portions of each leg member being connected to brackets mounted on said light transmissive openings.

* * * * *